United States Patent [19]
Gley

[11] 3,953,555
[45] Apr. 27, 1976

[54] DIFFUSER CONNECTOR FOR AERATION HEADER

[75] Inventor: Paul R. Gley, Hillsdale, N.J.

[73] Assignee: Envirex Inc., Waukesha, Wis.

[22] Filed: May 6, 1974

[21] Appl. No.: 467,035

[52] U.S. Cl. ............................. 261/124; 239/542; 239/550; 285/162
[51] Int. Cl.² .................. F16L 19/00; B01D 47/02; B05B 15/00
[58] Field of Search ........... 239/271, 272, 390, 391, 239/392, 542, 547, 550; 285/DIG. 22, 162; 261/123, 124

[56] References Cited
UNITED STATES PATENTS

| | | | |
|---|---|---|---|
| 873,485 | 5/1907 | Ball | 239/587 |
| 1,177,884 | 6/1915 | Molesta et al. | 239/550 |
| 2,650,132 | 9/1953 | Reinecke | 239/542 |
| 2,909,328 | 1/1959 | Babyak | 239/542 |
| 3,008,649 | 3/1961 | Bock et al. | 239/550 |
| 3,198,441 | 6/1965 | Facius | 239/550 |
| 3,214,102 | 10/1965 | Meyer | 239/550 |
| 3,269,664 | 1/1966 | Lamb et al. | 239/272 |
| 3,334,819 | 5/1967 | Olavson | 261/124 |
| 3,434,746 | 11/1969 | Watts | 285/162 |
| 3,503,554 | 3/1970 | Clifton | 239/550 |
| 3,651,646 | 3/1972 | Grunau | 261/124 |
| 3,753,527 | 4/1973 | Galbraith et al. | 239/542 |
| 3,841,349 | 10/1974 | Todd | 239/542 |

FOREIGN PATENTS OR APPLICATIONS 300,546    1915    Germany ........................... 285/162

Primary Examiner—Tim R. Miles
Assistant Examiner—Gregory N. Clements
Attorney, Agent, or Firm—Sughrue, Rothwell, Mion, Zinn & Macpeak

[57] ABSTRACT

The diffuser connector includes an elastic base part which is in the form of a tube adapted to be inserted into a round opening formed in the air header pipe wall. The connector also includes a rigid insert having a stem which, when pushed through the base, flares the tube to form a grommet which secures the base to the pipe. A cooperating detent means between the base and the insert at the same time secures the latter to the base. The connector provides the quick securement of the diffuser to the pipe with the required air seal therebetween and does not require threading or any other finishing of the pipe opening. The diffuser may comprise separable parts, one of which includes the insert and the other includes the air outlets.

4 Claims, 9 Drawing Figures

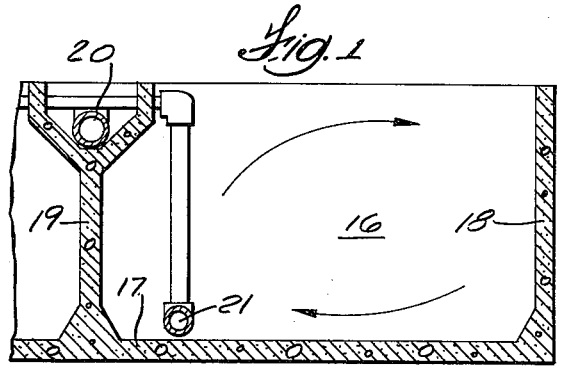
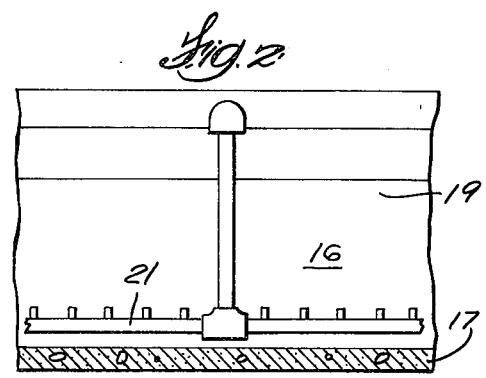
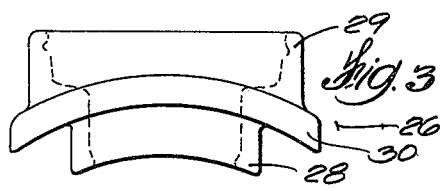
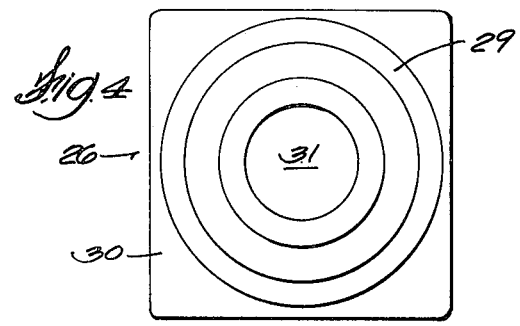
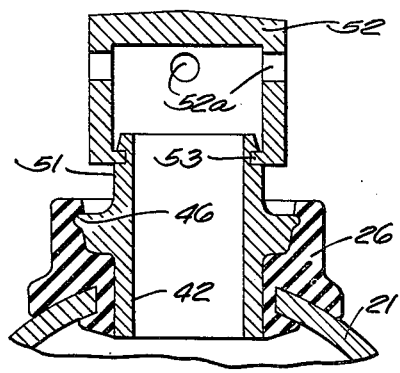
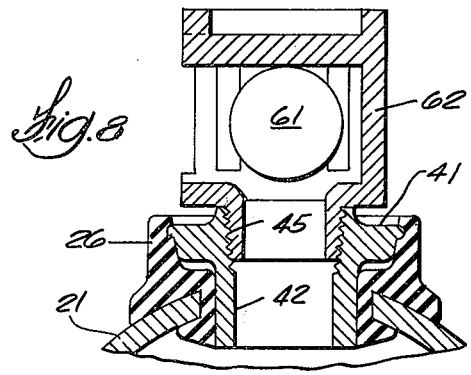
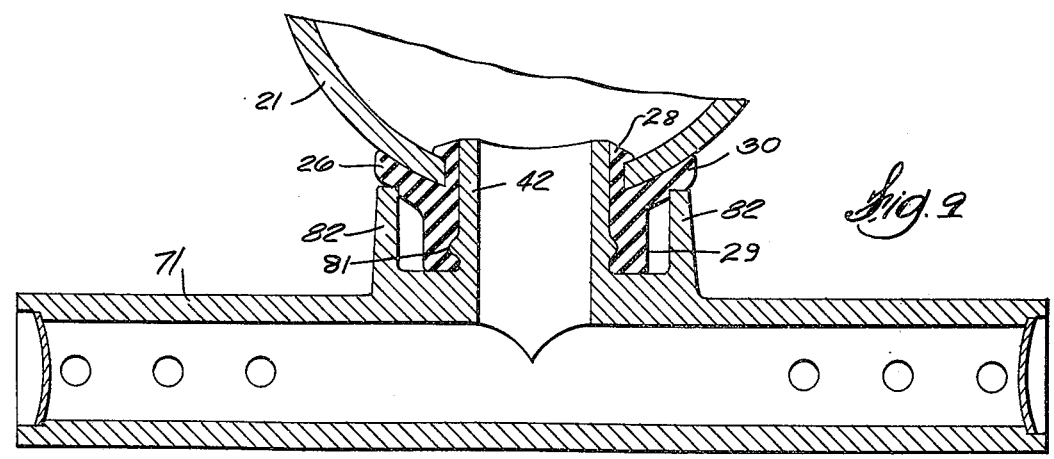

3,953,555

DIFFUSER CONNECTOR FOR AERATION HEADER

BACKGROUND OF THE INVENTION

The Field of the invention is submerged multiple jet liquid contact devices in Class 261-124. This invention is intended for use in the aeration of sewage for its aerobic biological treatment. U.S. Pat. Nos. 2,911,205 and 2,986,382 show such devices which have had great commercial success.

The prior art includes many types of aeration diffusers, for example, porous plates of sintered material, socks of woven fabric, and metal or plastic devices having single or multiple orifices. Virtually all such devices in the past have been provided with a threaded connector which requires that the header pipe be provided with a corresponding threaded hole. While this may seem a minor matter, a single sewage treatment plant installation may include thousands of such diffusers and require the drilling and threading of thousands of holes therefor in the header pipes. Recent improvements in low cost plastic diffuser devices and the possible use of plastic or resin pipe have indicated the need for an acceptable and reliable alternate and less costly method of connecting the diffuser devices to the header pipes.

SUMMARY OF THE INVENTION

The diffuser connector of the present invention includes a rigid insert and an elastic tubular base having a tube which is adapted to be extended through a plain round opening of a pipe of a selected diameter. The diffuser and the insert may be integral. The inner diameter of the tube is constricted so that insertion of the stem of the insert therein expands and flares the inner end of the tube to form a grommet within the pipe such that it presses the inside of the pipe around the opening and securely locks the base to the pipe. The base also includes an outer flange or saddle which is fitted against the outside of the pipe around the opening. The outer collar of the base and a flange of the insert also form a detent whereby the insert is securely locked to the diffuser base.

BRIEF DESCRIPTION OF THE DRAWING

FIG. 1 is a vertical cross section of a sewage treatment aeration tank and the air supply with submerged outlets.

FIG. 2. is a similar section showing the air header in side elevation.

FIG. 3 is an end elevation of the elastic base of the connector.

FIG. 4 is a plan view of the elastic base.

FIG. 7 is a vertical section through the combination which includes the connector and a diffuser having a removable cap provided with orifices of a selected size.

FIG. 8 is a vertical section of another combination embodying the present invention and which includes an air diffuser device having a ball check valve.

FIG. 9 is a vertical section through another combination which includes an air diffuser comprising a sub-header extending cross-wise of and below the air supply header pipe.

DESCRIPTION OF THE PREFERRED EMBODIMENT

Figure 5:
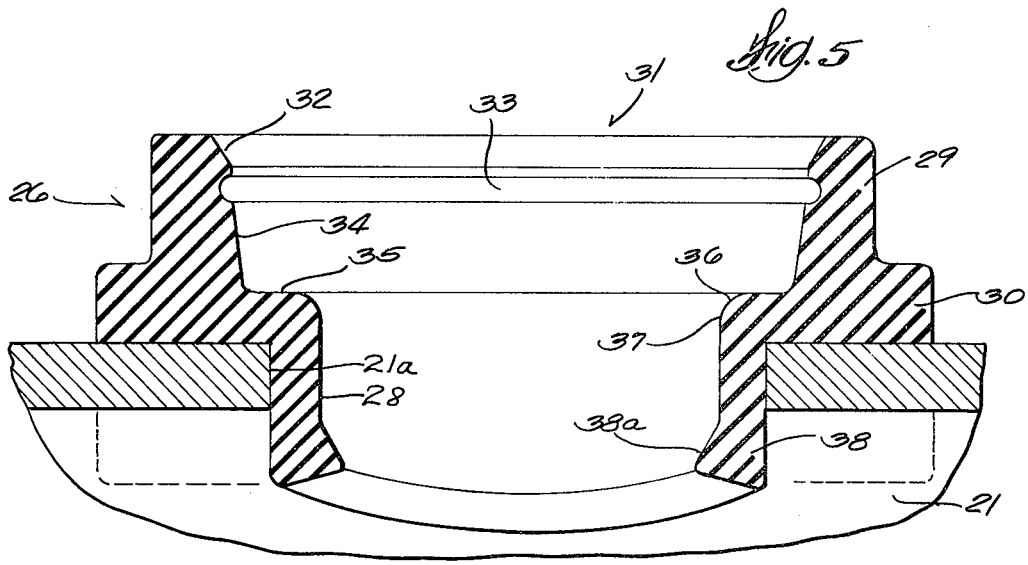
FIG. 5 is an enlarged vertical cross section of the base and a part of the air supply header pipe taken longitudinally of the pipe.

The aeration tank 16 shown in part in FIGS. 1 and 2 of the drawings includes the bottom 17, the side wall 18 and the dividing wall 19 which carries the main air supply line 20. Line 20 is connected by suitable joints and pipes to the lower horizontal headers 21 which extend alongside wall 19 and discharge air into the tank contents for two purposes.

As in a typical aeration tank, the location of headers 21 is such that the air from whatever diffusers are employed and carried by the headers effects an upward movement of the sewage (mixed liquor) in the tank alongside wall 19. At the surface of the liquid the flow proceeds across the tank to the wall 18 opposite wall 19, then downwardly along the wall 18 and back across the tank over bottom 17. Such movement or rolling of the tank contents is important to keeping the suspended solids in suspension and is essential to effect the needed mixing of the tank contents for the biological process which is carried out in the tank. The use of released air is to supply the microorganisms of the process with the required dissolved oxygen. For that purpose, the air is diffused or discharged as bubbles of minimum size to provide the maximum possible air-water interface area per volume of air. The partial pressures of the free and dissolved oxygen then determine the rate of transfer of oxygen from the air to the water. The length of time the bubbles remain in the liquid is in part a function of the efficiency of the tank.

The present invention provides for quickly attaching possibly any known type of air diffuser to header 21 and comprises the elastic base 26 and an insert which itself may comprise or be a separable part of the diffuser. Examples of both are shown and will be separately described.

As shown in elevation in FIGS. 3 and 4, the elastic base 26 is of unitary construction and includes the tube 28, the collar 29, and the saddle 30 which surrounds the collar where it joins the tube. Base 26 is formed of any suitable elastic, chemically stable material of which several are currently available. The exterior of the tube and collar is circular and the saddle is shaped to fit the outside surface of header 21.

As shown in more detail in FIG. 5, header 21 is first drilled to provide a round hole 21a to receive the tube 28, which is preferably of a size slightly larger than the hole to provide a slight interference fit. The base 26 is applied to header 21 by pushing tube 28 into hole 21a to seat saddle 30 on header 21 as shown. Base 26 has a stepped bore 31 therethrough which is then in communication with the interior of header 21.

The profile of the bore is of particular significance, and its features proceeding inward from the outer face of collar 29 include a chamfered lead-in section 32, an annular locking groove 33, and an intermediate tapered section 34 which extends to a shoulder 35 of a step 36. The profile features of the tube-portion of the bore include an straight cylindrical portion 36 and an inward flange 38 which forms a constriction or ramp 38a at the end of bore 31 internally of header 21.

Figure 6:
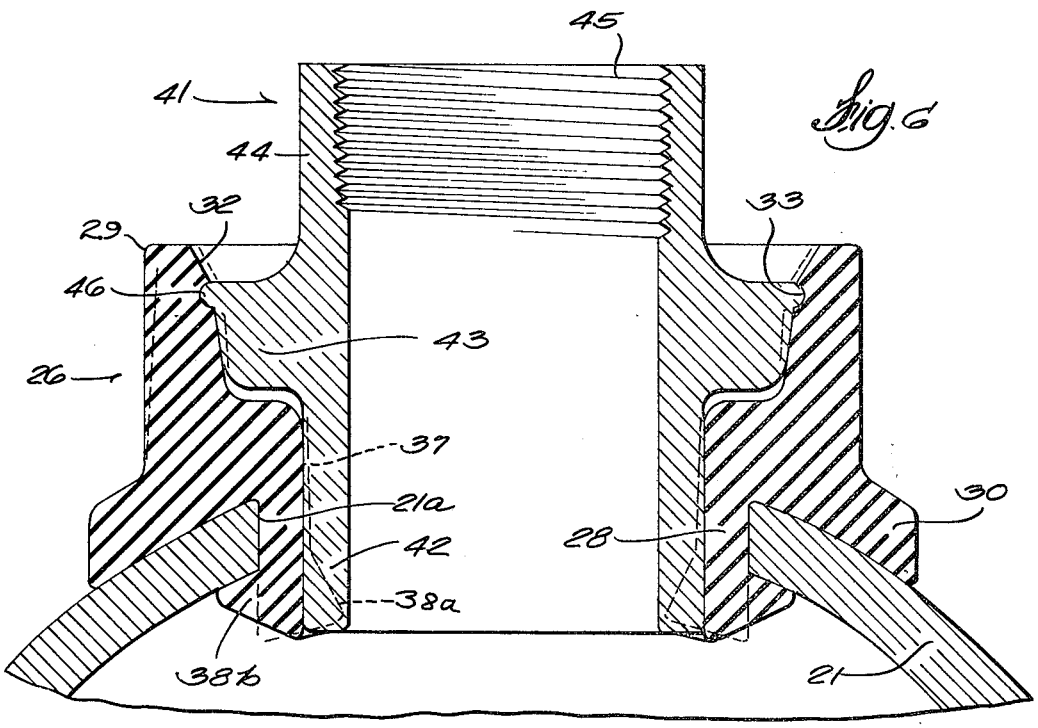
FIG. 6 is an enlarged vertical cross section of the base and insert assembled on the pipe. The section is normal to the pipe; the broken lines indicate the outline of the elastic base prior to the insertion of the stem of the insert. The part shown is threaded to receive the threaded end of a diffuser.

A threaded insert 41 shown in FIG. 6 comprises here a separable part of a diffuser it includes a straight stem 42 which is inserted in bore 31, an enlarged band 43 and an outer end 44 which is provided with threads 45. Insert 41 is molded of a sturdy rigid chemically stable material of which there is a wide selection commercially available.

The outside diameter of stem 42 is of a size slightly larger than the diameter of the straight section 37 of bore 31 so that its insertion therein expands tube 28 whereby the latter is further tightly fitted against the wall of header 21 which defines the hole 21a.

As the end of stem 42 is forced against ramp 38a of base 26, the end of tube 28 within header 21 is expanded and flared to form an external flange 38b against the internal wall of header 21 surrounding hole 21a. Tube 28 with saddle 30 and flange 38b form a grommet which firmly grasps the header 21 around the entire periphery of hole 21a.

The axial dimensions of insert 41 are also such that as the flange 38b is being formed by stem 42, an annular ridge 46 on band 43 of the adapter engages the chamfered section 32 of collar 29 and elastically expands the collar 29 as the ridge 46 approaches the groove 33. As the ridge 46 moves into the plane of groove 33, the elasticity of base 26 causes collar 29 to return toward its original size so that the ridge 46 is firmly seated in the groove 33 and the insert 41 is thereby firmly secured to base 26 and to header 21. The normal dimensions of base 26 and of the cylindrical portion 37 of the bore 31 are shown by the broken lines in FIG. 6. As will be noted, collar 29 is normally somewhat smaller than when fitted around the band 43 of insert 41. Similarly the cylindrical portion 37 of the bore 31 is normally smaller than the outer diameter of stem 42 so that a tight fit is provided therebetween and the tube 28 of base 26 is firmly pressed against the surface of the header 21 which defines the hole 21a in which the base is mounted.

Several diffusers are shown in FIGS. 7 – 9. For convenience, those parts corresponding with the parts of insert 41 which have been described will be identified with the same reference characters.

The diffuser of FIG. 7 comprises the insert 51 and a removable cap 52. The insert includes the stem 42 and locking ridge 46 which is seated in the groove of base 26. The cap 52 includes an inner lip 53 which is snapped over the outer end of insert 51 and fits the corresponding annular groove to hold the cap 52 on the insert 51. Cap 52 is provided with a number of air outlet holes 52a of a selected size. The general construction of the diffuser comprising insert 51 and cap 52 is such that the cap may be readily interchanged with another, not shown, having air outlets of a different number or size.

In FIG. 8 the diffuser is in the form of a ball check valve. A ball 61 is trapped within a housing 62. The latter includes a threaded end which fits in the threads 45 of the insert 41 which includes stem 42 and is fitted in base 26.

The cross-header 71 shown in FIG. 9 is intended to illustrate further the considerably different diffusers with which the present invention may be utilized.

The cross-header 71 is molded with open ends and the upward stem 42. The ends are plugged and the air outlet holes may be molded or drilled. The tube 28 of base 26 has been flared to form the grommet which secures the base to the underside of header 21.

The collar 29 of base 26 is similarly interlocked with the ridge 81 of the cross-header to hold the latter and secure both the cross-header and the base to air supply header 21. The two upright braces 82 engage the parallel opposite edges of saddle 30 to hold the cross-header steady. These braces are possibly required because of the considerable elasticity of the material which may be selected for base 26.

With such elasticity a single base 26 may be assembled in header 21 in only a few seconds. This represents a great saving having in mind that a header having holes 21a would ordinarily require tapping or threading, cleaning and assembly requiring many hours.

Utilizing the present invention, the header need only be drilled with the requisite number of holes. In only a few minutes a workman with a supply of bases can place the entire requisite number of bases on the header with their tubes worked into the holes (having a slight interference fit). The same person or another workman with a supply of inserts or diffusers and a rubber mallet can tap into place the entire requisite number of inserts or diffusers with inserts in only a few more minutes.

The several advantages of the present invention include not only the remarkable facility with which each insert or diffuser with insert may be assembled with the header, but also the ease of disassembly by manual operation in the reverse. Of course, the greater effort which is required to dissasemble the assembly evidences the "easy-on but stay-tight" character of the assembly.

Two advantages are particularly realized from the elasticity of the base. One is the total dependability of the seal or absence of leaking air despite the saddle shaped hole which is due to the curvature of the header wall. The other advantage is similar in that each diffuser is somewhat elastically mounted. Many times in the initial assembly of the diffused air system such as shown in FIGS. 1 and 2 and often in the course of maintenance, an individual diffuser may be struck with a tool or strike the concrete of the tank or some other pipe. While the diffuser may not be damaged, its connection to the header may be damaged at least to the extent that the air seal of the connection is ruptured. Because of the elasticity of the base, the diffuser and the air seal is to a degree protected against such accidents.

Another feature provided by the elastic base is its adaptability to different pipe sizes, within limits. That is, while the hole size requires some accuracy which is readily provided with a conventional drill, the thickness of the pipe walls is only of such uniformity as is specified. The elasticity of the bases 26 thus allows the lowest cost pipe available to be specified. Also, while the saddle 30 is of a circular profile as shown in FIG. 3 to match that of the header, that is, a header of a given diameter, the base may be used as well with headers of slightly larger diameters. For example, if the saddle radius is 2 inches for a header of 4 inches outside diameter, the elasticity of base 26 fully allows its use with a header of up to 5 inches in diameter.

Base 26 may also be used if the header diameter is something less than four inches, using the same example, although the tolerance is not so great in this direction. That is, if the saddle 30 is designed with a slightly larger radius as is shown by the broken line in FIG. 6, the expansion of collar 29 which is effected by flange 43 of the diffuser tends to deform the saddle toward a spherical shape. The ends of the saddle shown in FIG. 5 are then pressed more tightly against header 21, and the lower sides of the saddle as shown in FIG. 6 are pressed against the header.

Thus, the elasticity of base 26 eliminates most of the difficulties in providing an adequate seal between the diffuser and the header, and as well has a great tolerance for dimensional variations of the header, excepting only the size of the drilled hole.

I claim:

1. The combination of a gas diffuser and a connector which consists of an elastic base, a rigid insert and means securing the diffuser to one end of said insert; said insert having a stem at the other end thereof, a flange intermediate its ends and a gas passage therethrough and in communication with the diffuser; the elastic base having a tube at one end, a collar at the other end, an intermediate saddle, and a stepped bore extending therethrough, said saddle being adapted to be mounted on a gas supply pipe with the tube of tha base extended through a hole formed in the wall of the pipe and with the collar extending from the pipe, the bore at the end of the tube being constricted whereby endwise insertion of the stem of the insert flares the tube to form a grommet so that when so disposed the grommet secures the base to the pipe, the flange of the insert being of a size to expand the collar of the base upon such insertion and to provide then the lateral support of the insert and the diffuser with respect to such pipe, the flange and collar being formed with an annular projection and a corresponding recess which together function as a detent securing the stem and flange against endwise removal from the bore of the base and preventing separation of the insert and the diffuser from the pipe.

2. The combination of a gas diffuser and a connector, said combination comprising:
   a. a generally cylindrical base made of an elastic material, said base comprising:
      i. a tube the outer surface of which is cylindrical and the inner surface of which defines a bore which has a constriction at a first end thereof,
      ii. a saddle which joins the tube at the end thereof opposite to said first end, the inner surface of which defines a bore which is a continuation of the bore in the tube, and the outer surface of which extends radially outwardly from the outer surface of the tube, and
      iii. a collar which joins the saddle at the end thereof opposite to the tube and the inner surface of which defines a stepped bore which is a continuation of the bore in the saddle, the stepped bore defining, from the end opposite to the tube towards the tube, a chamfered lead-in section, an annular locking means, an intermediate section, and a shoulder leading to the bore defined by the shoulder and the tube;
   b. a generally cylindrical insert made of a rigid material, said insert comprising:
      i. a hollow straight stem the outer surface of which is slightly larger in diameter than the inner diameter of the bore defined by the saddle and the tube of said base and the inner surface of which defines a bore for the passage of air and
      ii. a hollow enlarged band which joins the stem at a first end thereof, the inner surface of which defines a bore which is a continuation of the bore in the stem, and the outer surface of which has, from the end opposite to the stem towards the stem, an annular locking means adapted to engage the annular locking means on the collar of said base and an intermediate section which is slightly larger in diameter than the inner diameter of the intermediate section of the stepped bore in the collar of said base, the axial distance from the annular locking means on the band on said insert to the end of the stem opposite to the band being sufficient so that, when the annular locking means on the band is engaged with the annular locking means on the collar, the end of the stem opposite to the band is forced axially against the constriction in the tube, causing the first end of the tube to expand to form an external flange; and
   c. a gas diffuser connected to said hollow enlarged band.

3. The combination as claimed in claim 2 wherein the intermediate section in the collar of said base and the intermediate section in the enlarged band of said stem are both inwardly tapered.

4. The combination as claimed in claim 2 wherein the annular locking means on the collar of said base is an annular locking groove and the annular locking means on the enlarged band of said stem is an annular ridge.

* * * * *